(12) United States Patent
Reeder et al.

(10) Patent No.: US 7,581,204 B2
(45) Date of Patent: Aug. 25, 2009

(54) DYNAMIC CONTEXTS

(75) Inventors: Uwe Reeder, Riegelsberg (DE); Markus Cherdron, Muehlhausen (DE); Stephan Ritter, Saarbruecken (DE); Frank Weigel, Saarbroecken (DE)

(73) Assignee: SAP AG, Walldorf (DE)

( * ) Notice: Subject to any disclaimer, the term of this patent is extended or adjusted under 35 U.S.C. 154(b) by 975 days.

(21) Appl. No.: 10/859,593

(22) Filed: Jun. 1, 2004

(65) Prior Publication Data
US 2005/0268277 A1 Dec. 1, 2005

(51) Int. Cl.
*G06F 9/44* (2006.01)
(52) U.S. Cl. .................... 717/105; 717/113
(58) Field of Classification Search ............... None
See application file for complete search history.

(56) References Cited

U.S. PATENT DOCUMENTS

| | | | |
|---|---|---|---|
| 6,496,202 B1 * | 12/2002 | Prinzing | 715/762 |
| 6,664,978 B1 * | 12/2003 | Kekic et al. | 715/733 |
| 6,687,698 B1 * | 2/2004 | Nixon et al. | 707/10 |
| 6,996,800 B2 * | 2/2006 | Lucassen et al. | 717/106 |
| 7,225,424 B2 * | 5/2007 | Cherdron et al. | 717/104 |
| 2001/0020255 A1 * | 9/2001 | Hofmann et al. | 709/318 |
| 2002/0199031 A1 | 12/2002 | Rust et al. | |
| 2003/0023953 A1 | 1/2003 | Lucassen et al. | |
| 2003/0163479 A1 | 8/2003 | Mathews et al. | |
| 2004/0133898 A1 * | 7/2004 | Cherdron et al. | 719/332 |

FOREIGN PATENT DOCUMENTS

EP 0 996 058 A1 4/2000

OTHER PUBLICATIONS

European Search Report for EP 0202423, dated Sep. 18, 2002.
Althammer et al., "Design and Implementation of a MVC-Based Architecture for E-Commerce Applications," International Journal of Computers & Applications, pp. 1-22, XP002367765 (2001).
Krasner G. et al., "A Cookbook for Using the Model-View-Controller User Interface Paradigm in Smalltalk-80," Joop, vol. 1, No. 3, pp. 26-49, XP008041541 (Aug. 1988).
Freedom for Developers, published at http://www.sap.info/public/INT/int/printout/article/PrintEdition-2, XP002399327 (Oct. 12, 2002).

* cited by examiner

*Primary Examiner*—Tuan Q Dam
*Assistant Examiner*—Isaac T Tecklu
(74) *Attorney, Agent, or Firm*—Finnegan, Henderson LLP

(57) ABSTRACT

Methods, apparatus, and computer program products that implement techniques for extending the MVC design pattern by structuring data of an application into application contexts. The techniques feature accessing a predetermined structure for a storage area, modifying the predetermined structure and creating an instance of the storage area according to the predetermined structure. The storage area relates to a controller. The controller is operable to manipulate a model and a view. The view includes multiple UI elements for presenting data from the model. The predetermined structure includes multiple design-time context elements and relationships between the design time-context elements. At least one of the UI elements is bound to one of the design-time context elements. The instance of the storage area includes multiple run-time context elements. Each run-time context element corresponds to one of the design-time context elements.

14 Claims, 11 Drawing Sheets

At Design Time

At Run Time

DYNAMIC CONTEXTS

BACKGROUND

The present invention relates to electronic data processing in general, and particularly to application programming.

In the model-view-controller (MVC) design methodology used for developing application programs, one or more models can implement the application logic of an application program. Each model can correspond to multiple views, where each view displays information about the model to a user. A controller of the application can receive events, for example, raised by a user interacting with a view to manipulate the model.

A model can have multiple controllers, and controllers can relate to one or more views. Controllers can also relate to an application in general, or to one or more application parts or components. Models and controllers typically include application code. When changes occur in a model, the model can update its views.

Data binding can be used for data transport between a view and its model or controller. For example, a table view can be defined to display data of a corresponding table that is stored in the model or controller. The table is used as the data source for the table view (data binding). For instance, the table view can be replaced by a further view, such as a form view, that binds against the same table. In this case, the further view can display the table data without changing anything in the controller or the model.

When building a software application, predefined relationships can exist between various data elements used by the application. Predefined relationships can be defined in a variety of ways; for example, the relationships can be defined through dependencies in a relational database. However, for some data elements, predefined relationships do not exist, for example, when no relationship is defined in a database or when it is data elements that refer to the model on the one hand and to the view on the other hand. Therefore, usually a significant portion of an application's code is devoted to defining the corresponding relationships and to enabling data transport, for example, from the model to the view.

Moreover, at a given point in time, an application has a specific state that reflects the current status of the interaction of the user with the application (e.g., which view the cursor of the application is currently situated on, and which row of a specific table in the view has been selected by the user). Typically, an application developer has to write application coding to memorize and administer the state (e.g., by using state variables).

SUMMARY

The present invention provides methods, apparatus, and computer program products that implement techniques for extending the MVC design pattern by structuring data of an application into application contexts.

In general, in one aspect, the techniques feature accessing a predetermined structure for a storage area, modifying the predetermined structure and creating an instance of the storage area according to the predetermined structure. The storage area relates to a controller. The controller is operable to manipulate a model and a view. The view includes multiple UI elements for presenting data from the model. The predetermined structure includes multiple design-time context elements and relationships between the design time-context elements. At least one of the UI elements is bound to one of the design-time context elements. The instance of the storage area includes multiple run-time context elements. Each run-time context element corresponds to one of the design-time context elements.

The techniques can be implemented to include one or more of the following features.

The design-time context elements comprise nodes and attributes. The relationships organize the nodes and attributes in a hierarchical arrangement. The run-time context elements comprise node collections. Modifying the predetermined structure comprises adding new nodes and attributes to the hierarchical arrangement. Creating the instance of the storage area comprises generating new node collections corresponding to the new nodes and attributes.

The techniques further feature resetting the predetermined structure to an initial state.

Modifying the predetermined structure comprises mapping one of the design-time context elements to a second design-time context element in a second, distinct predetermined structure for second, distinct storage area.

The model comprises multiple model objects of multiple different types. At least one of the design-time context elements references one of the model objects and has an associated method operable to access the attributes of the referenced model object. At design time, the type of the referenced model object is declared to be generic, and at run time, the type of the referenced model object is updated to reflect a specific type, the specific type being any one of the multiple different types.

In general, in another aspect, the techniques feature (1) executing an application that includes at least one view, the view comprising multiple user interface (UI) elements for presenting data from a model, the model comprising multiple model objects; at least one controller for manipulating the model and the view; at least one storage area corresponding to the controller, the storage area including a context tree, the context tree being structured according to a metadata tree and referencing one or more of the model objects; and one or more bindings linking the UI elements in the view and the context tree; and (2) during execution of the application, modifying the metadata tree; and modifying the context tree according to the modified metadata tree.

The techniques can be implemented to include one or more of the following features.

The metadata tree includes nodes; and modifying the metadata tree includes adding a node to the metadata tree or deleting a node from the metadata tree.

The context tree includes node collections. Modifying the context tree includes adding a node collection to the context tree or deleting a node collection from the context tree.

The metadata tree includes attributes that represent application data. Modifying the metadata tree includes adding an attribute to the metadata tree or deleting an attribute from the metadata tree.

The metadata tree includes attributes that represent application data. The application data has a data type. Each attribute has a data type corresponding to the data type of the application data being represented. Modifying the metadata tree includes changing the data type of one of the attributes in the metadata tree.

The techniques further feature, after modifying the metadata tree, resetting the metadata tree by removing any modifications made to the metadata tree during execution of the application.

The techniques further feature, after resetting the metadata tree, deleting one or more portions of the context tree. The portions of the context tree correspond to the removed modifications in the metadata tree.

The application includes a second storage area having a second context tree. The second storage area includes a second context tree structured according to a second metadata tree. The techniques further feature, during execution of the application, mapping a portion of the first metadata tree to a portion of the second metadata tree. The portions of the first and second metadata trees comprise one or more of nodes and attributes.

Each of the model objects has a model object type and includes one or more attributes. The metadata tree includes one or more model nodes. Each model node includes a reference to one of the model objects. The metadata tree further includes one or more generic model nodes. Each generic model node is a model node that includes methods operable to access the attributes of model objects having distinct model object types.

The methods include a getter method for retrieving a value of an attribute of a referenced model object and a setter method for setting the value of the attribute of the referenced model object.

The techniques can be implemented to realize one or more of the following advantages. A system implementing an extended MVC design pattern in accordance with the invention can reduce the amount of storage that is needed to store an interaction status by eliminating redundant data storage. A system implementing an extended MVC design pattern can also improve data consistency within an application, by eliminating the program code redundancy that originates from using multiple variables for the same data. Such a system can additionally define relationships between data elements in a declarative way. Therefore, specific functions (e.g., filter functions) can be implemented without application-specific program code. Data relationships can be declared generically, which enables the data relationships to be used by views that are developed using different technologies or formats, (e.g., PDF instead of HTML).

The ability to modify contexts at run time enables contexts to be used in applications that are not fully defined until run time and enables context elements to be created based on configuration data that is read at run time.

The ability to reset run-time modifications to a context enables the context to be reused.

Late mappings make possible mappings involving portions of the context that are created at run time.

Generic model nodes enable model nodes to be declared even when the data type of the model object to which the model node refers is not yet known.

These general and specific aspects can be implemented using a computer program, a method, a system or apparatus, or any combination of computer programs, methods, or systems. The details of one or more embodiments of the invention are set forth in the accompanying drawings and in the description below. Other features, objects, and advantages of the invention will be apparent from the description, the drawings, and the claims.

DETAILED DESCRIPTION

The present invention extends the MVC design pattern to include the concept of contexts. This will be referred to as the extended MVC design pattern.

Figure 1:
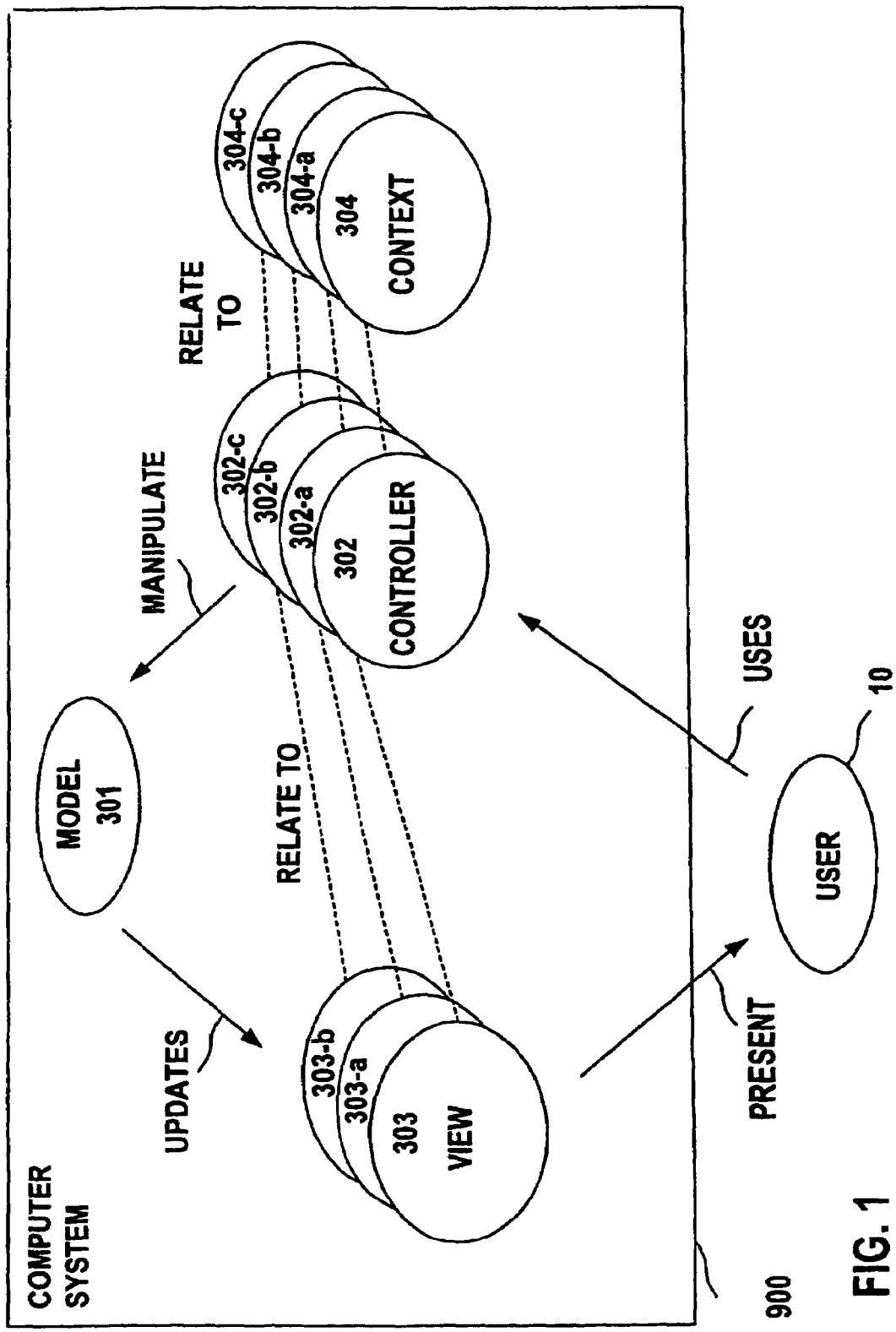
FIG. 1 is a simplified block diagram of a computer system that implements an extended MVC design pattern with application contexts.

FIG. 1 is a simplified block diagram of a computer system 900 that realizes an implementation of the extended MVC design pattern. In general, the extended MVC design pattern provides a context as a storage place for data that relates to a controller. A context can be used to store the local data of a controller, as well as data fields that reference data stored in other contexts or defined in a model (mapping between contexts is explained below). Data in local data fields can exist as long as the corresponding context exists. The lifecycle of data in a model can be managed externally. A context storage space can be structured, as illustrated below.

The user interface (UI) elements in a view can be bound to the data elements in a context. In this manner, multiple UI elements can display the same data (and can be used to modify the data), without having to transport the data between the views or create multiple copies of the data. Moreover, the data elements in a context can be bound to data elements in a model. In this manner, the extended MVC design pattern interposes contexts between views and models. Rather than access a model directly, views can instead access contexts, which in turn access models. The extended MVC design pattern thus uses contexts as intermediary storage that stores only the data needed by an application. The contexts can be used to identify, extract, and maintain the user state of an application, which includes the portion of a model that is relevant for a particular application and user. Contexts thus act as a buffer between the views and the model, and allow applications to perform many optimizations—for example, contexts can be used to store recently used data so that such data does not need to be re-calculated in the course of the execution of an application. By acting as buffer, contexts also allow model instances to be used by multiple user instances.

A context instance 304 generally relates (dashed line) to a controller instance 302. Context instances and controller instances will be referred to as contexts and controllers, respectively. The controller 302 can manipulate a model 301 in response to an interaction of a user 10 with the computer system 900. There can be additional controllers (e.g., additional controllers 302-a, 302-b, 302-c) for manipulating the same model 301. The additional controllers can have additional contexts 304-a, 304-b, 304-c that relate (dashed lines) to the additional controllers, respectively. The model 301 can have multiple views (e.g., views 303, 303-a, 303-b) that present data about the model to the user 10. When the model 301 gets modified by at least one of its controllers, it can update its views. Each view relates (dashed lines) to a controller. There can be controllers (e.g., controller 302-c) that do not relate to any view. In certain implementations, a controller can relate to multiple views.

In some application development environments, application development is divided into two general stages: a design-time process and a run-time process. The design-time process can include steps such as designing the views of an application (including the layout of the user interface elements in each view), modeling of the application flow (including the navigation between the views), designing one or more models, and creating and editing other application components, such as controllers and contexts. The design-time process can also include other steps, such as the binding of UI elements within the views to data sources that are defined in a data type repository.

The information created during the design-time process can include application metadata. The application metadata can be stored in a metadata repository, and used as input to the run-time process. During the run-time process, the application metadata can be used to generate the actual run-time code of an application. In some implementations, the application metadata is platform-independent, and the generated run-time code is platform-specific. The run-time code can be executed in a run-time environment that provides a general framework for running applications. For example, a run-time environment can provide services for deploying and maintaining applications, as well as features such as a caching mechanism that can be used to improve performance, and automatic input assistance and default error handling that is based on the declared application metadata.

In the extended MVC design pattern, the declared application metadata includes a description of the data elements in a context and the relationships between those data elements. In one implementation, the context metadata is arranged into a tree structure (referred to as a metadata tree) to reflect a hierarchical relationship between the data elements (e.g., a "customer" data element that includes a "sales order" data element, which in turn includes a "product" data element). A metadata tree can be made up of nodes. Each node can include one or more attributes (which represent the actual data elements), as well as one or more child nodes (which can have further attributes and further child nodes).

In one implementation, a context includes two parts at runtime: (i) a run-time version of the metadata tree, and (ii) an instantiation of the run-time version of the metadata tree, which will be referred to as the context tree. The context tree holds the actual application data and can be constructed according to the structure defined by the run-time version of the metadata tree.

In the context tree, each node in the run-time version of the metadata tree can correspond to a collection (referred to as a node collection) of node elements. Each node element is a single instance of a node (e.g., a particular customer node with a specific name attribute and a specific address attribute). At runtime, a customer node in the context tree might have a node collection of such node elements, because, for example, a view associated with a corresponding controller might be used to provide a list of customers. In this scenario, the context tree associated with the controller has a node element for each customer, and the entire node collection corresponds to the customer node in the metadata tree.

Figure 9:
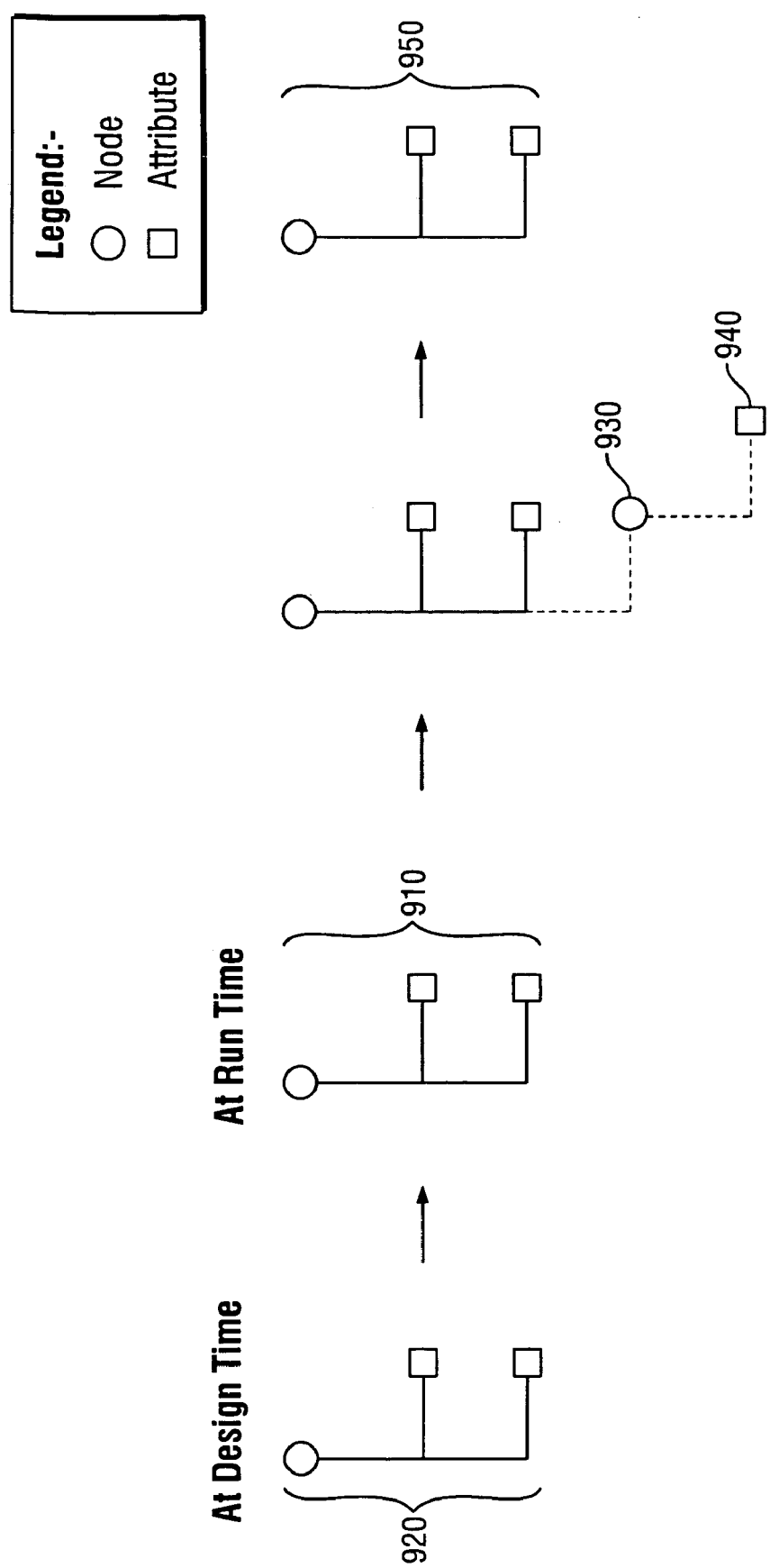
FIG. 9 illustrates an example of dynamic modification of contexts.

In one implementation, as shown in FIG. 9, the run-time version 910 of the metadata tree is initially identical in structure to the design-time version 920 of the metadata tree. However, the run-time version 910 of the metadata tree can be modified dynamically at run time. For example, node 930 and attribute 940 can be added to or deleted from the metadata tree 910 at run time. The data type of an attribute can also be changed at run time. Once the run-time version 910 of the metadata tree has been modified, it can subsequently be reset 950 back to its initial state.

When the metadata tree is modified or reset at run time, its corresponding context tree is also modified or reset. The data in the context tree is retained to the extent that such data corresponds to nodes and attributes in the initial state of the metadata tree.

The ability to modify contexts at run time is useful in situations where the application's model is not fully defined until run time. For example, a view may include a table, which is bound to a node in the context of a corresponding controller. But it may not be known until run time what model objects will be displayed in the table. Thus, it is only at run time that the appropriate columns can be added to the table, and that the corresponding attributes can be added to the context node.

One type of application that may not be fully defined until run time is a pattern-based application. A pattern is a configurable, reusable unit designed to let users accomplish a specific but generically defined task, such as searching for business objects, and modifying business objects. To create a pattern-based application, an application developer selects a pattern from a collection of available patterns and configures it to produce configuration data. The configuration data and the pattern are then combined to produce the run-time components for the application, including the application's models and views. Typically, however, the process of producing the run-time components does not occur until run time. Thus, it may not be possible to specify the full structure of the application contexts until run time. In such a scenario, the context can be defined initially during design time. Then during run time, further modifications to the context can be as described above.

Figure 2:
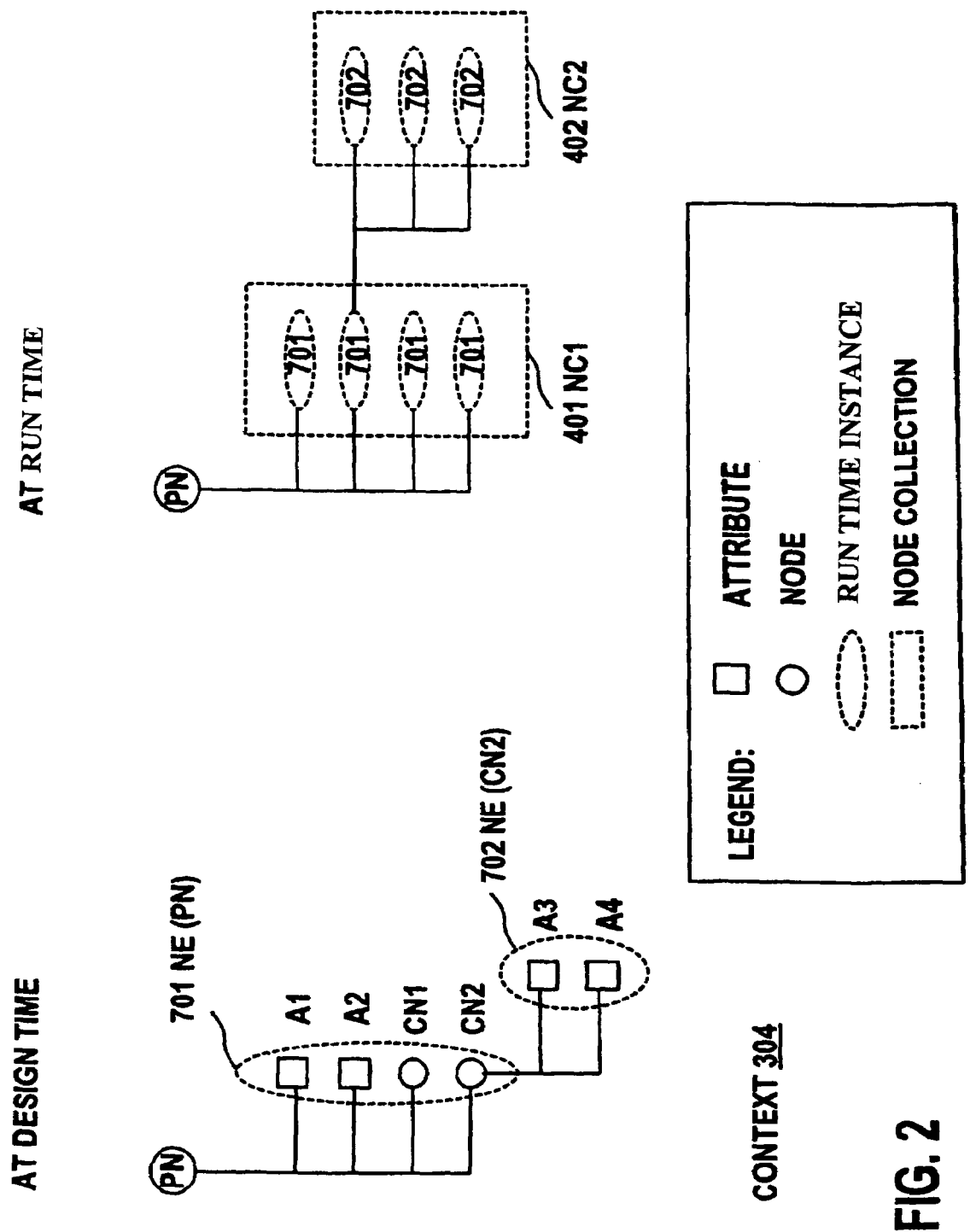
FIG. 2 illustrates an example structure of a context at design time and at runtime.

FIG. 2 illustrates an example of a metadata tree for a context 304 at design time and a corresponding context tree at runtime. In general, the structure elements of a design-time context structure can be different from the structure elements of a run-time context structure.

An example of a design-time context structure is a node hierarchy (e.g., a metadata tree), wherein the structure elements of the node hierarchy can be nodes and attributes. The root node of the node hierarchy represents the context itself. The child nodes of the root node can be defined by the application. Child nodes of the root node will be referred to as independent nodes. Child nodes of independent nodes depend on their corresponding parent node and will be referred to as dependent nodes.

A node can have a node type. Examples of node types are value nodes and model nodes. A value node can maintain, that is, store and administer, its own application data (transient application data). The data can be, for example, scalar data, tables, or structures. A model node includes a reference to application data that persists in a corresponding model.

A node can also have attributes. Each child node can include an arbitrary tree structure that includes further child nodes and/or attributes. Attributes are leaves in the tree structure. Attributes can represent, for example, scalar data types (e.g., strings and integers), or Java types (e.g., java.util.Date).

In the example shown in FIG. 2, at design time, the context 304 includes the independent node PN, which includes the two attributes A1 and A2, and which is the parent node of the dependent nodes CN1 and CN2. The second dependent node CN2 has two further attributes, A3 and A4. This structure defines a first node element 701 for the parent node PN and a second node element 702 for the second child node CN2. The first node element 701 includes information about the context structure with regards to the parent node PN. In other words, it describes the context structure level that is under the level of the parent node PN. The second node element 702 includes information about the context structure with regards to the second dependent node CN2. As indicated by the context structure, the second node element 702 depends on the first node element 701.

At runtime, structure elements (e.g., nodes) in the context tree can represent a set of data instances. Nodes can provide type information about object instances that are maintained by the node. Each node can correspond to a node collection, wherein each element of the node collection has the same node element type.

In the example shown in FIG. 2, at runtime, the parent node PN has a first node collection 401 that includes multiple run-time instances of the first node element 701. Each run-time instance of the first node element 701 can have a second node collection 402 of multiple run-time instances of the second node element 702. A node collection can be empty or have at least one instance of a corresponding node element.

A node collection can have a node collection type (e.g., a list, tree, set, or collection), and cardinality. The node collection type (examples of which are shown in Table 1 below) and the node collection cardinality (examples of which are shown in Table 2 below) can be declared at design time. An evaluation mechanism can be used to automatically evaluate the node collection of a child node at run-time when its parent node changes.

TABLE 1

Examples of node collection types

| Type | Meaning |
| --- | --- |
| collection | forward-only iterator (cursor) without absolute positioning |
| set | no duplicates, forward-only iterator without absolute positioning |
| list | duplicates allowed, position available, list iterator, absolute positioning (indexed access) |

The application can use the cardinality of a node collection to restrict possible operations on a node (e.g., prohibiting indexed access to a node that has at most one node collection element).

TABLE 2

Examples of the cardinality of a node collection

| Cardinality | Meaning |
| --- | --- |
| 0 . . . 1 | node collection can be empty, contains at most one element |
| 1 . . . 1 | node collection always contains exactly one element |
| 0 . . . n | node collection can be empty or contain any number of elements |
| 1 . . . n | node collection always contains at least one element |

The content of a node collection can be determined in various ways. The node values of independent nodes can be set by initializers or event handlers, or through a supply function. In one implementation, a supply function is called when a node is first accessed. A node can be accessed, for example, when the node is queried for its data by application code or by a user interface element (in a view) that is bound to the node.

Dependent nodes can get their values through a supply function. For example, the node collection of a dependent node can become obsolete when a selection of its parent node changes (e.g., if a parent "customer" node changes because the user selects a different customer, a child "sales order" node can become obsolete). In this case the dependent node is re-determined, that is, the content of its node collection is determined on a subsequent access. In another implementation, a representation instance is created for each dependent node of a parent node. The values of the representation instances are calculated when the corresponding parent node is accessed. In essence, representation instances create a "load data on demand" or a "unload data when not needed" mechanism, which uses memory in an efficient manner.

The content of a node collection can also be explicitly set to a state, such as "invalid" or "unfilled." When a node having such a state is subsequently accessed, the node collection content is determined again. This can be used to force a re-read of modified data when the modification (e.g., in the model) was not visible to the application runtime.

Figure 3:
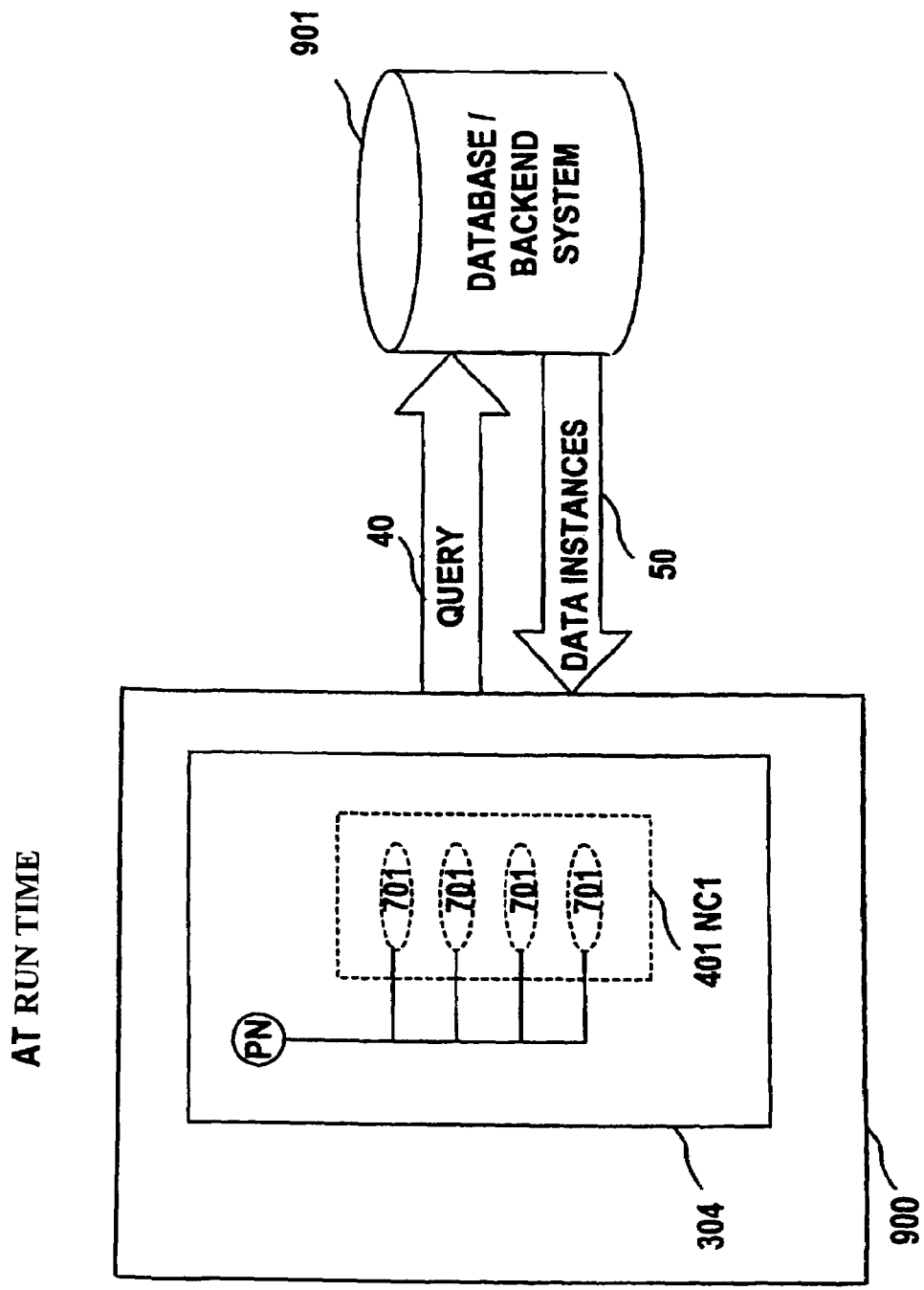
FIG. 3 illustrates a context at runtime as a set of data instances.

FIG. 3 illustrates a context 304 at runtime as a set of data instances. The nodes of the context at runtime represent a system-managed set of data instances (e.g., a java.sql-.RecordSet). For example, data instances are returned 50 from a database or backend system 901 in response to a query (e.g., a structured query language (SQL) query) that is sent 40 from the computer system 900 to the database/backend system 901 when a node is accessed, for example, by an application. Examples of backend systems are Enterprise Resource Planning (ERP) systems, Customer Relationship Management (CRM) systems, web server systems providing web services, or any other system that stores application data. Accessing a node can lead to a data request from an application model, which can result in a corresponding query request to the database/backend system 901.

Nodes can provide type information about the object instances that are maintained by the node. The type information can also be derived from the model. For example, if the parent node PN corresponds to a customer, its node collection 401 can include all orders for this customer. When the application accesses the parent node PN, the computer system 900 can send 40 a query to retrieve all orders of the customer from the corresponding database/backend system 901, such as a sales and distribution (SD) system or a CRM system. The retrieved orders (data instances) are then returned 50 to the computer system 900 context 304 to fill the corresponding data of elements of the node collection 401.

Figure 4:
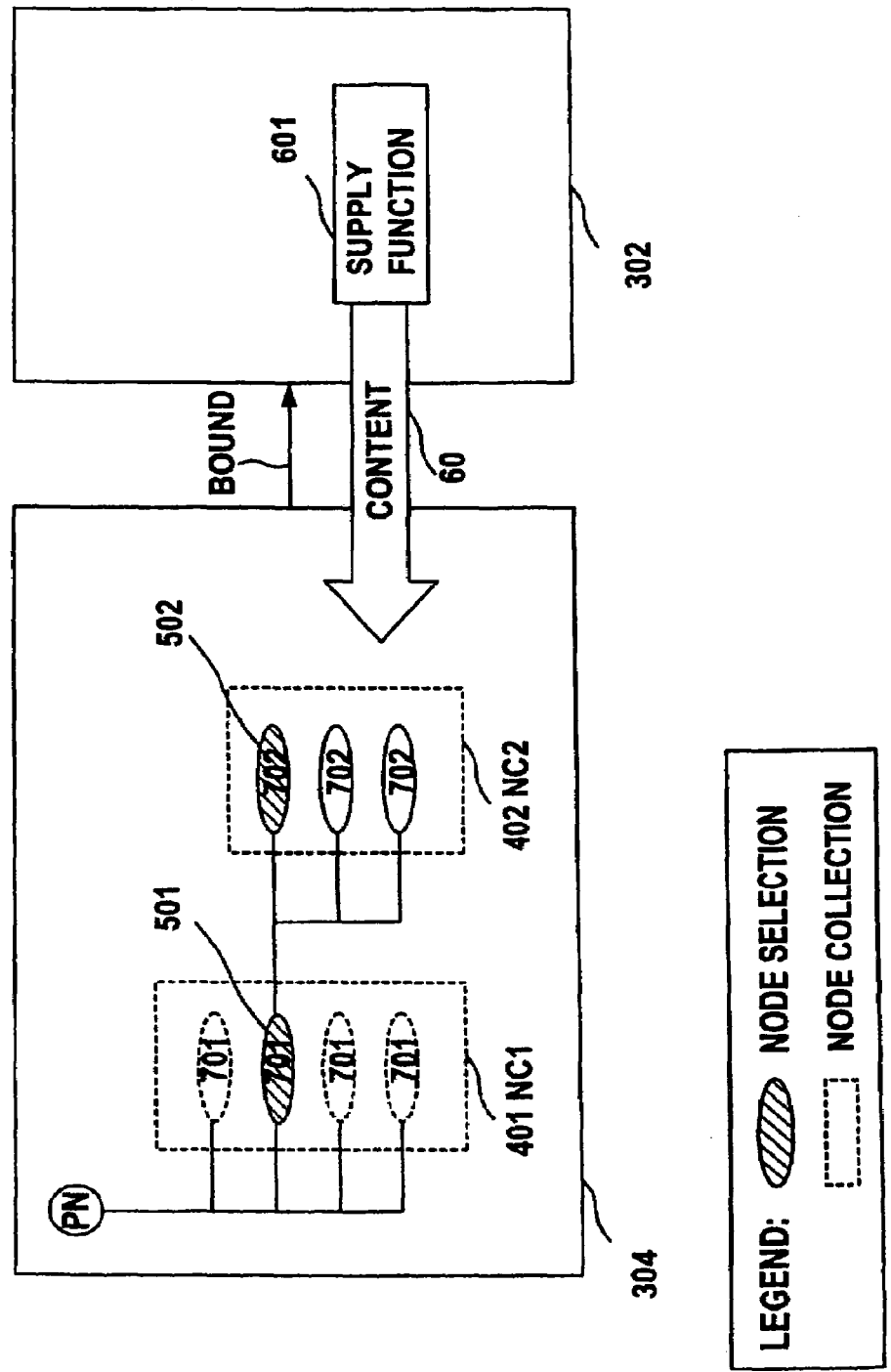
FIG. 4 illustrates an example of a node selection within a context at runtime.

FIG. 4 illustrates an example of a node selection 501 within a context 304 at runtime. A node PN can maintain a node selection 501 within a node collection 401. Node selections are illustrated in FIG. 4 by a grid pattern for each element of the node collection that belongs to the node selection. The node selection 501 is a designated subset of the node collection 401 of the node PN. The node selection 501 has a cardinality that is controlled by the cardinality of the selected nodes declared at design time (see Table 3 below for examples of the cardinality of a node selection).

One specific element that plays a special role among the elements of the node selection will be referred to as the lead selection element. For example, if the node PN corresponds to customer orders, the first node collection 401 can include all orders of a specific customer. By default, the lead selection of the node collection can be the first order of the customer. In this case, the second node collection 402 can include all order items of the selected order.

TABLE 3

Examples of the cardinality of a node selection

| Node Selection Cardinality | Meaning | Required Node Cardinality |
|---|---|---|
| 0 . . . 1 | single selection (≙lead selection), can be empty | any |
| 1 . . . 1 | single selection (≙lead selection), always contains one element | only 1 . . . 1, 1 . . . n |
| 0 . . . n | multiple selection, can be empty, if not empty one element is designated as the "lead selection" | only 0 . . . n, 1 . . . n |
| 1 . . . n | multiple selection, one selected element is designated as the "lead selection" | only 1 . . . n |

If a node selection is not empty at runtime, one of the elements of the node selection can be designated as the lead selection element. The lead selection element can be accessed from controller code. UI elements can be bound against the attributes of the lead selection element, and the content of a child node can depend on the lead selection element of its parent node. For example, the node selection 501 can correspond to a selection that results from a user action (e.g., a selection by the user of the second order out of a list of orders.) This can automatically trigger an update of the second node collection 402 with, for example, all order items of the second order. The second node collection 402 can have a further node selection 502. A node selection can also include multiple elements of the corresponding node collection.

Node selection and lead selection elements can be bindable node properties, in the sense that UI elements can represent a node selection (e.g., as selected lines in a table control), and can be used to modify the node selection (e.g., by selecting/deselecting items in a table control, which adds/removes the corresponding elements to/from the node selection). Thus, a selection made by a user can be represented as a node selection and a node selection can be visualized in a UI element. Node selections can also exist on their own.

A context can include a flat set of child nodes (independent nodes), each one independent from the others. Each independent node can have further child nodes (dependent nodes). While the content of an independent node is generally defined by an application, the content of a dependent node can depend on the lead selection element of its parent node. An application can define how the content of a dependent node depends on the parent node's lead selection element through the specification of a supply function. For example, a supply function can be used to specify that when a specific order (e.g., node selection 501) of a customer is selected, only order items that are not on stock should be included in the second node collection 402. In other words, the relationships between data that are declared in the context 304 at design time can be used to select or filter data at runtime.

As another example, a supply function can be defined in such a way that the function always returns the same value for the same selected node element and does not take into account changes in the returned data. In other words, the application runtime can decide not to call a supply function again with the same arguments when the supply function is called a second time within the lifetime of the application.

As another example, when a parent node (e.g., a sales order) is bound to a new node collection, the content of all of its child nodes (e.g., order items) can be marked "invalid." If a node is accessed when its content (node collection) is marked "invalid," its content can be determined again, for example, by calling a corresponding supply function 601 to supply content for the node.

Supply functions can be declared as methods in a corresponding controller 302 of a context 304. The following pseudo code shows an example of the interface or signature of a supply function:

Collection supplyFunction(Node node, NodeElement
        parentElement);

The code that is generated for an application can include code that calls a declared supply function when the content for a node is to be supplied 60.

Supply functions can be implemented to include one or more of the following features:

Node elements included in a returned node collection can match the type of the corresponding node (e.g., a node element created from the node or from a mapped node or from a corresponding model class, if the node is a model node).

The supply function can return enough data to match the declared cardinality of the node.

The returned node collection can depend on parameters of the supply function. The supply function can be called a second time within the lifetime of an application when at least one of the parameters is changed.

The supply function can be loaded on demand by the application.

The supply function can be used to set the lead selection of a node.

In one implementation, rather than returning a node collection, supply functions can be implemented to modify an existing node collection (e.g., a node collection that is initialized empty). For example, a supply function can be used to provide the content of a node element and add that node element to the node collection to be filled (i.e., the node collection being accessed). Supply functions can also access other node elements, remove node elements, swap or move node elements, and perform other functions on node elements. Supply functions can access the node collection of either the node being supplied or the parent node of the node being supplied. In some implementations, supply functions can also access other ancestor nodes, or even nodes in other contexts. Supply functions generally cannot access child nodes (since child nodes have not been initialized when a node is first accessed), and in some implementations, they are restricted from modifying any node collection other than the node collection being evaluated. In a load-on-demand implementation, initializing a node collection to be empty and allowing a supply function to add elements on demand means that the supply function can access the elements of the collection without causing recursion (i.e., without causing the supply function to be invoked again).

Figure 5A:
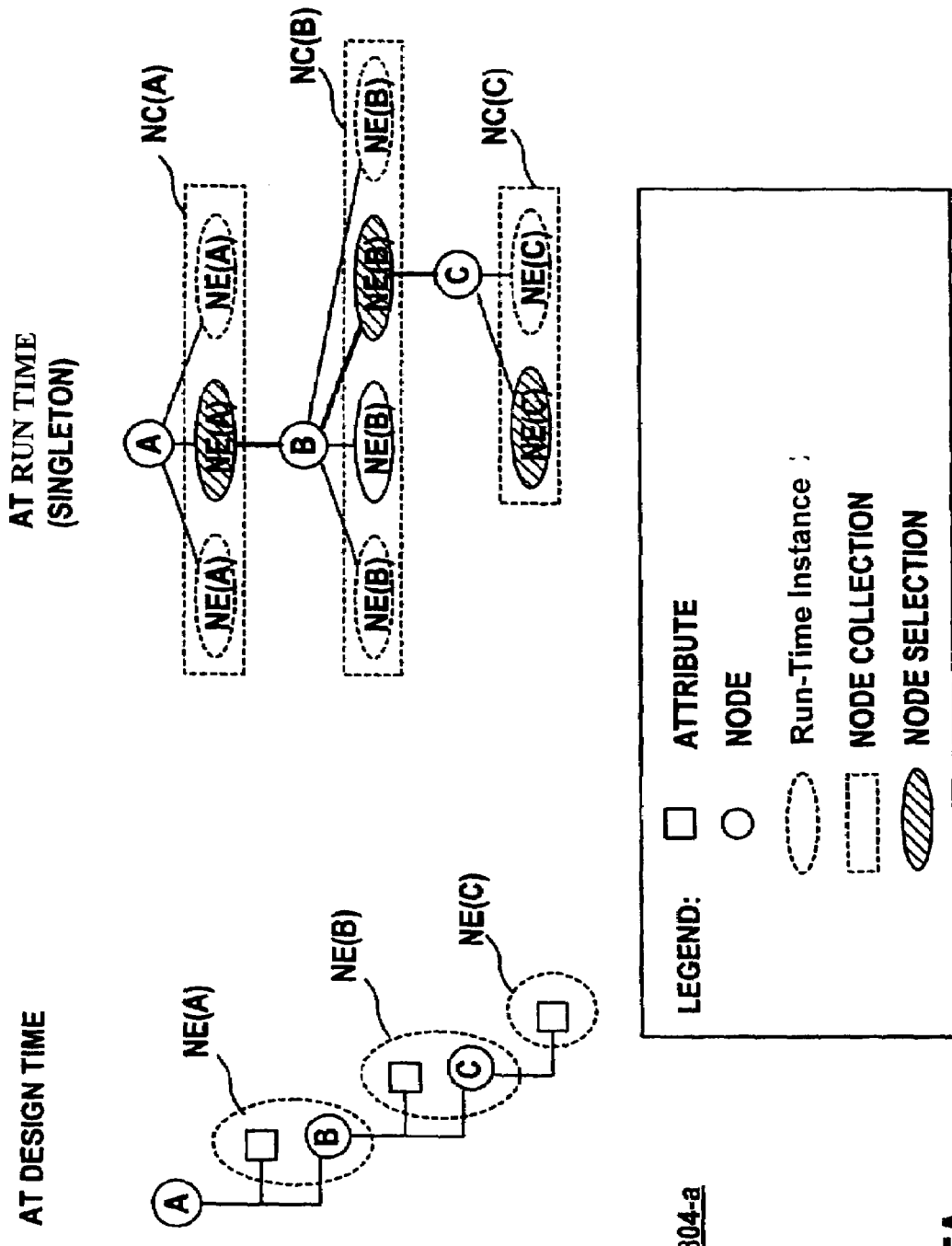
FIGS. 5A and 5B illustrate two alternative runtime implementations of context data instances.
Figure 5B:
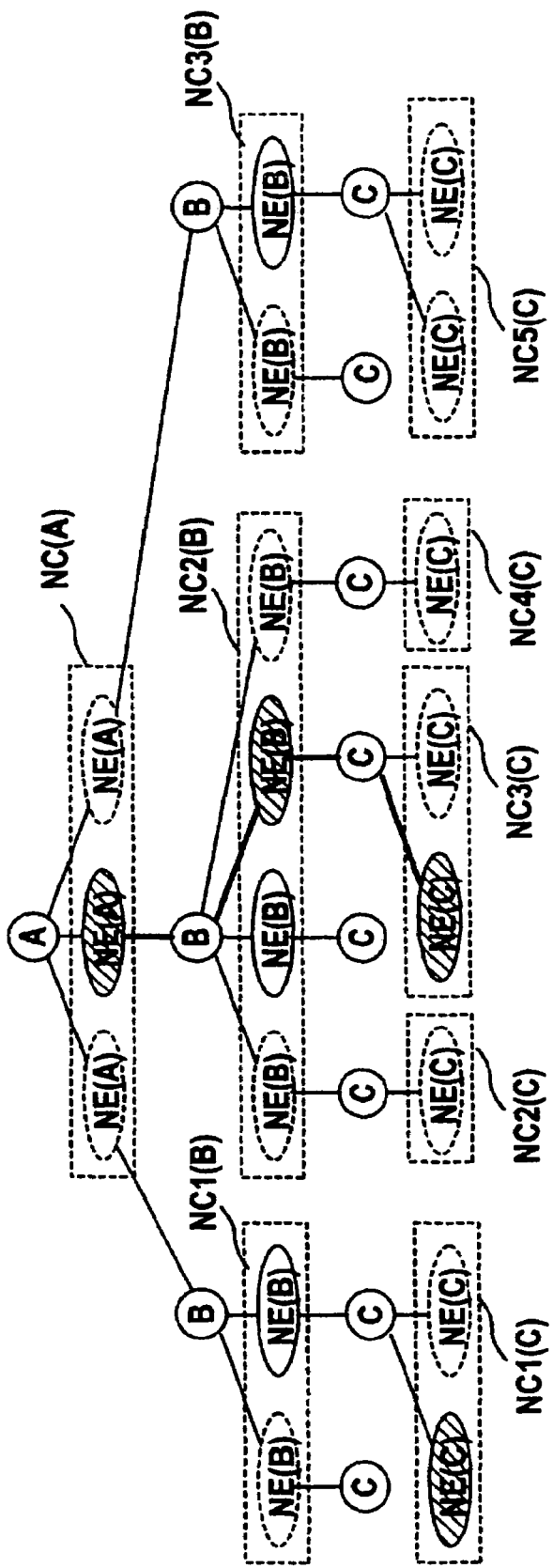
Figure 5B:
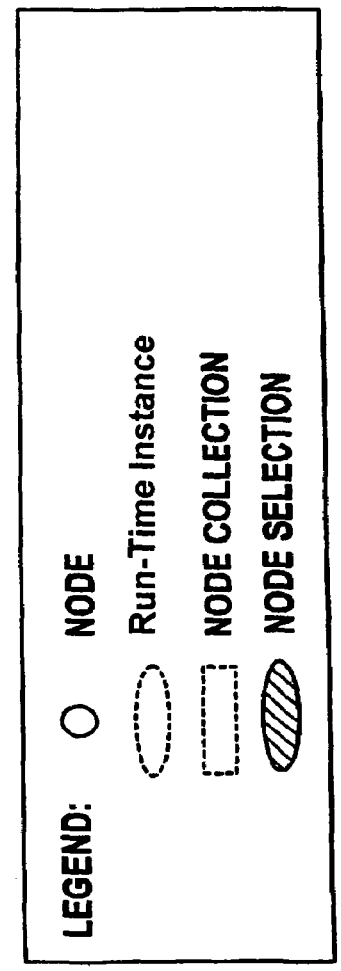

FIGS. 5A and 5B illustrate two alternative runtime implementations of context 304-*a*. In a first implementation (FIG. 5A), a dependent node (e.g., node B) can be represented as a single node instance whose node collection changes whenever the parent node's (e.g., node A) node collection or lead selection element changes. For example, for a single node instance, content (e.g., a node collection) can be maintained for the current lead selection of the parent node only. This can reduce usage of system resources, such as main memory, and enable static binding. Static binding means that a node binds to the "class" of the node instead of binding to a named node instance. A node according to the first implementation will be referred to as a singleton node.

FIG. 5A shows an example of a context structure of context 304-a at design time. Node A has a node element NE(A), node B has a node element NE(B), and node C has a node element NE(C), wherein each element includes child nodes and/or attributes. In a singleton node implementation, at runtime, a node collection NC(B) of node element NE(B) instances is only maintained for the lead selection of the node collection NC(A). Further, a node collection NC(C) of node element NE(C) instances is only maintained for the lead selection of the node collection NC(B).

In a second implementation (FIG. 5B), a single node instance of the node (e.g., node B) exists for each instance in the parent node collection (e.g., each node element in node collection NC(A)). Single node instances can be accessed directly. Single node instances can be created and filled by loading data on demand to reduce resource usage. In the second implementation, an application can also access data of child nodes that do not correspond to the parent node's lead selection element (e.g., address fields for a business partner other than the currently selected business partner). A dependent node according to the second implementation will be referred to as a non-singleton node.

FIG. 5B, which is based on the design-time context structure shown in FIG. 5A, shows an example of a run-time structure of context 304-a according to the second implementation. Each instance (node element) in node collection NC(A) can have a node collection—e.g., node collections NC1(B) to NC3(B). Further, each instance of node collections NC1(B) to NC3(B) can have a node collection—e.g., node collections NC1(C) to NC5(C). Empty node collections are not shown in the example.

Information identifying a node as a singleton node or non-singleton node can be stored in a node property "singleton" variable (see Table 4 below for example values for such a variable). If a non-singleton node acts as the parent node of a singleton node, the singleton node is not a singleton node with respect to the context. That is, for each instance of the non-singleton parent node, there exists one instance of the singleton child node. If the child node is a singleton node with respect to the context, then its parent node may change depending on its grandparent node's lead selection element.

A context can keep references to all created instances of a child node until the parent node collection changes. This enables a client in a client-server system to remember data from previously received child node instances and modify such data later. The server can keep such data and maintain a consistent picture of which data is in the current context (e.g., the context of the current view).

TABLE 4

Example values for a node property singleton variable

| Value | Meaning |
| --- | --- |
| True | a single instance of the node exists per parent node; the content of the node changes when the parent node's lead selection element changes |
| False | one instance of the node exists per node element in the parent node's node collection; the content of an instance does not change |

All instances of a child node can be accessed through a typed context application programming interface (APT).

If a parent node is a singleton node, only a single instance exists and can be accessed, and its content depends on the parent node's node collection and lead selection element. For example, at design time, a tree structure can be declared including an independent node "Customers" that has a child node "Orders," which has a further child node "OrderItems." Each customer can have multiple orders, and each order can have multiple order items. This scenario can be reflected in a corresponding context by declaring child nodes belonging to each element of the parent node so that each element has a collection of its own.

Context Lifetimes

Figure 6:
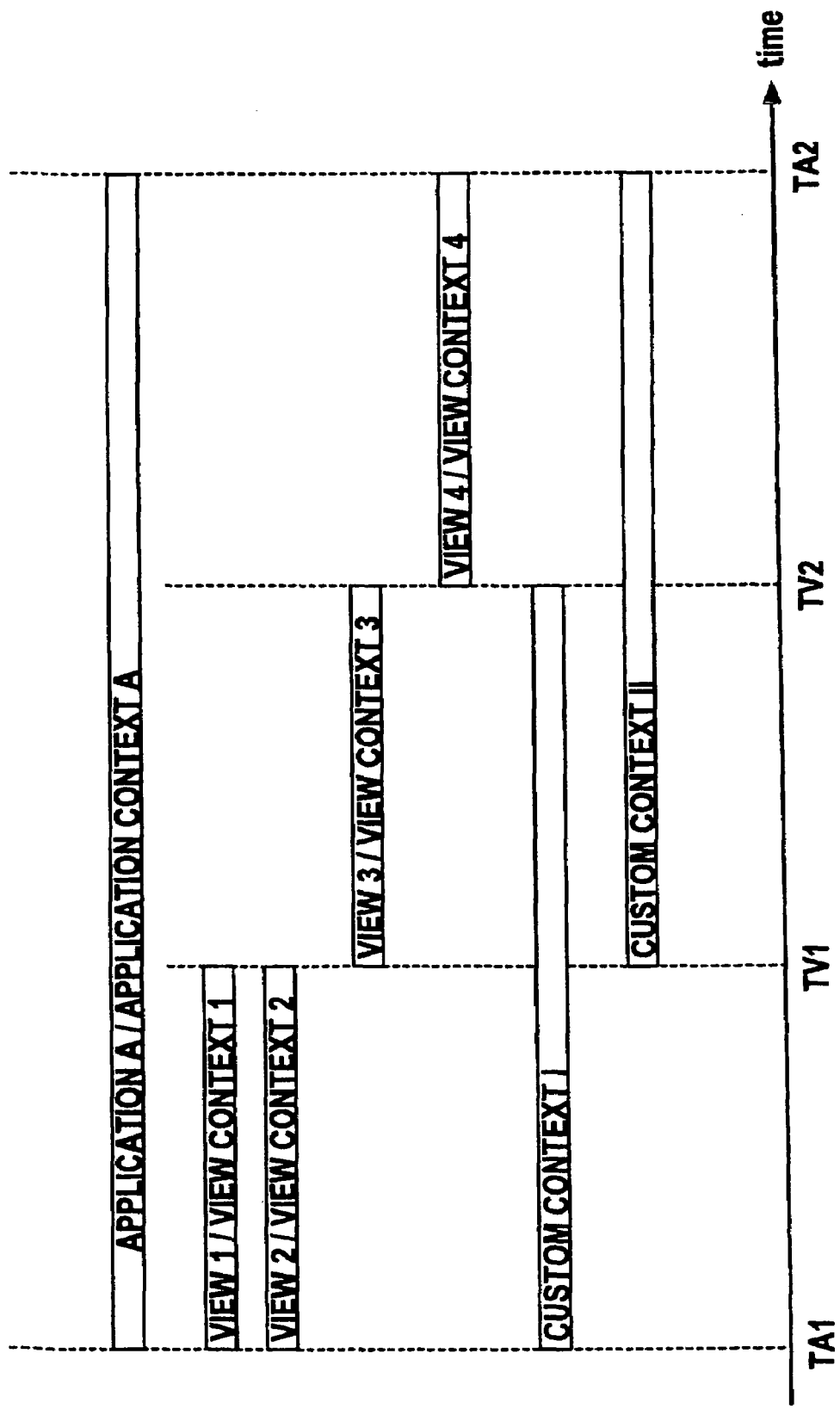
FIG. 6 illustrates an example of context lifetimes for various context types.

In some implementations, there are multiple types of contexts, and the lifetime of a context can depend on its type. FIG. 6 illustrates an example of context lifetimes for various context types. In one implementation, there are at least two types of controllers (view controllers and custom controllers) and, correspondingly, two types of contexts (view contexts and custom contexts).

A view controller relates to a corresponding view. The lifetime of the view controller matches the lifetime of the corresponding view (i.e., the time that the view is displayed). A view context relates to the view controller and has the same lifetime. UI elements of the view can bind to the view context. When executing an application (e.g., APPLICATION A) that is built according to the extended MVC design pattern, typically a sequence of multiple views (e.g., VIEW 1, VIEW 2, VIEW 3, VIEW 4) is presented to a user. The user interacts with the application program through the various views. The various views can raise events that cause the related view controllers to determine which view is presented when and where. Some views, and therefore the related view contexts, can have short lifetimes.

In the example in FIG. 6, APPLICATION A starts at TA1 and ends at TA2. When the application starts, VIEW 1 and VIEW 2 are presented to the user simultaneously. At TV1, the corresponding view controllers determine that the presentation of VIEW 1 and VIEW 2 needs to be replaced by a presentation of VIEW 3. At TV2, the corresponding view controller determines that the presentation of VIEW 3 needs to be replaced by a presentation of VIEW 4. The views VIEW 1 to VIEW 4 relate to the view contexts VIEW CONTEXT 1 to VIEW CONTEXT 4. Accordingly, the data that is stored in each view context has the same lifetime as the view that binds to the data.

Some data needs to span the lifetime of multiple views. A custom context can be defined for this purpose. A custom context can relate to a custom controller of the application. A custom controller can be implemented as view-independent, application-process-oriented code. The lifetime of a custom context can be defined in such a way that it spans the lifetime of multiple views.

In the example of FIG. 6, CUSTOM CONTEXT I is defined to span the lifetime of the views VIEW 1 to VIEW 3. CUSTOM CONTEXT II is defined to span the lifetime of the views VIEW 3 and VIEW 4.

A specific example of a custom context is an application context that persists over the lifetime of the application (i.e., over the sequence of all views of the application). In the case of a custom context, the application specifies the context lifetime, whereas in the case of an application context, the system specifies the context lifetime because the system knows when an application starts (TA1) and when it ends (TA2). Therefore, the system can control an application controller that corresponds to the application context.

Context Mappings

Figure 7:
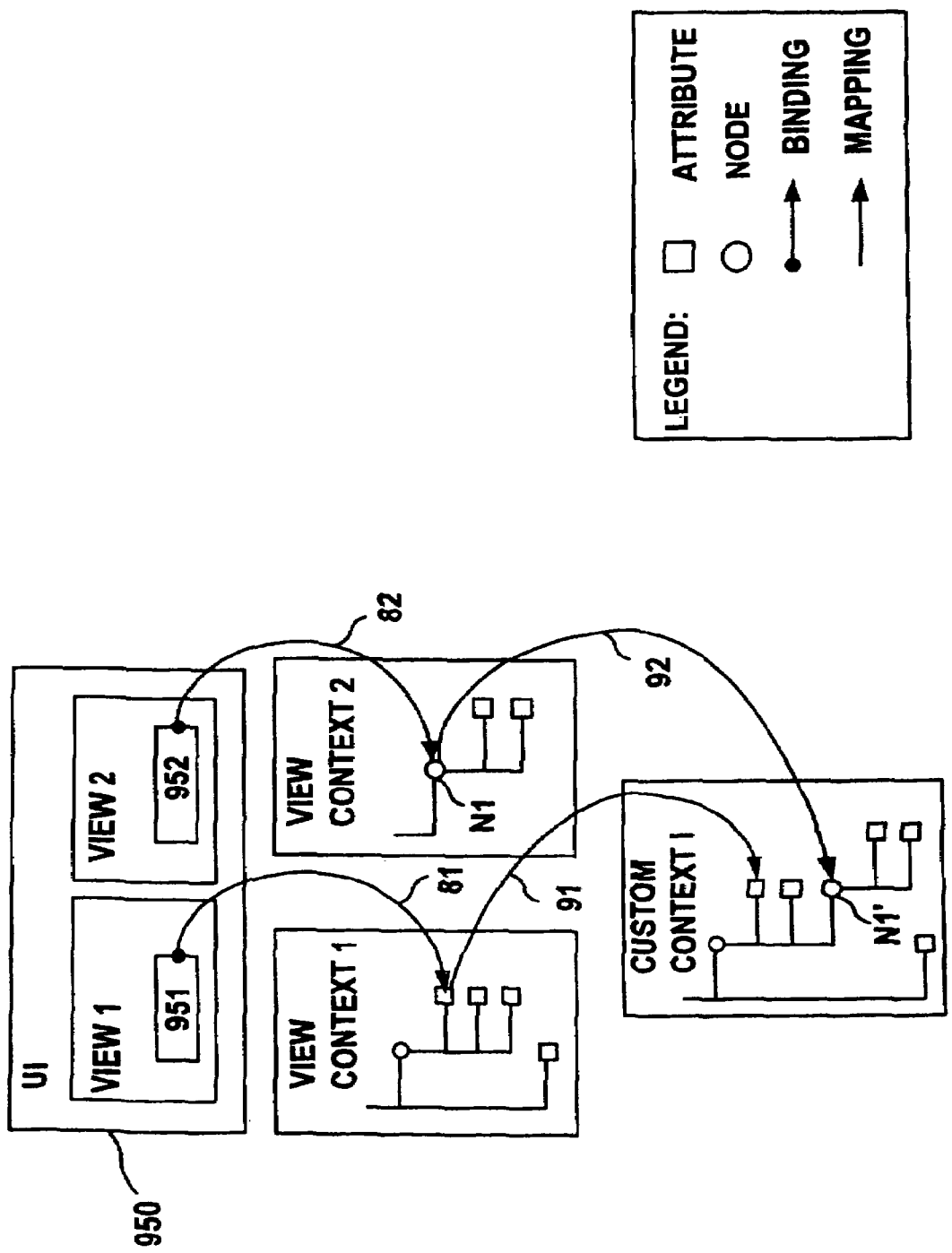
FIGS. 7 and 8 illustrate examples of mappings between contexts.

FIG. 7 illustrates the concept of mappings between contexts. In the example in FIG. 7, UI elements (e.g., UI elements 951, 952) of views (e.g., VIEW 1, VIEW 2) that are used in a user interface 950 bind 81, 82 to view contexts (e.g., VIEW CONTEXT 1, VIEW CONTEXT 2), and long-persisting data resides in custom contexts (e.g., CUSTOM CONTEXT I). In the implementation shown in FIG. 7, nodes and attributes of view contexts and custom contexts can be mapped 91, 92 to nodes and attributes of other custom contexts. In other words, nodes and attributes of view contexts and custom contexts can reference type-compatible nodes and attributes (including individual nodes and entire sub-trees) in other custom contexts. An example of an attribute that can be mapped is an attribute that represents the value of the lead selection element. Nodes can also be mapped to other nodes within the same context.

Node mapping reduces the need for copying data between multiple contexts by enabling a node N1 of a first context (e.g., a view context, such as VIEW CONTEXT 2, or a custom context) to reference 91 a node N1' of a second context (e.g., a custom context, such as CUSTOM CONTEXT I, or an application context), where the node N1' of the second context has or references the data. The same applies for attributes.

In an implementation that permits mappings between contexts, data can be manipulated in a custom (or application) context, and each view context that references the custom context provides its corresponding view with the current data that is stored in the custom context. Mappings can span multiple context levels. For example, a custom context can reference a further custom context. Context hierarchies can thus be created (see, e.g., FIG. 7).

Mappings allow related data to be collected in a dedicated custom context. Binding to such data can be implemented by using a view context that is mapped to the dedicated custom context.

Mappings allow developers to modify an application quickly while maintaining the consistency of the application data. For example, in some cases rearrangement of views or UI elements can be achieved without modifying the code of the corresponding view controllers. This provides a way for application developers to better structure applications in light of potential functional enhancements or changes. For example, reusing a field that already exists in one view in additional views can be achieved by defining an appropriate mapping.

The following two examples explain various features of mappings that can be implemented with the present invention.

In the first example, if a node M ("Mapped Node") is mapped to a node O ("Origin Node"), node M maps its node collection to node O's node collection. The node selections of nodes M and O can also be mapped. Node M can also maintain its own node selection on node O's node collection. The node collection cardinality of node M can equal that of node O (e.g., by inheritance). The selection cardinality can be inherited from origin node O. Node M can also override the node cardinality inherited from node O.

If node O is a singleton node, node M is also a singleton node. If node O is a non-singleton node, node M can either be a singleton node or non-singleton node. If node M is a non-singleton node, it shares the same parent node collection with node O. If node M is a singleton node, then the collection of node M follows the instance of node O that belongs to the lead selection of node O's parent node.

For mapped nodes, the content of a node collection can be defined by the node collection of the origin node.

In the second example, an independent node can also be mapped. The mapping can be to any other node in the same context or to any other node in another context (as long as no cycle is formed with regards to parent-child and mapping relationships).

When a parent node is mapped to a further parent node, a child node of the parent node can be mapped to a further child node of the further parent node. In other words, if node W is a child of node X and node Y is a child of node Z, node W can be mapped to node Y if node X is mapped to node Z. A child node of a mapped node can be unmapped, in which case its content can be determined by a supply function.

If a child node of a mapped node is mapped to a child node of the corresponding origin node, then either the mapped node maps to the node selection of the origin node, or the origin node is a non-singleton node. This avoids a conflict between the dependencies implied by the parent/child relationship and the mapping relationship that results from mapping a selection of a child node of an unmapped node.

Figure 8:
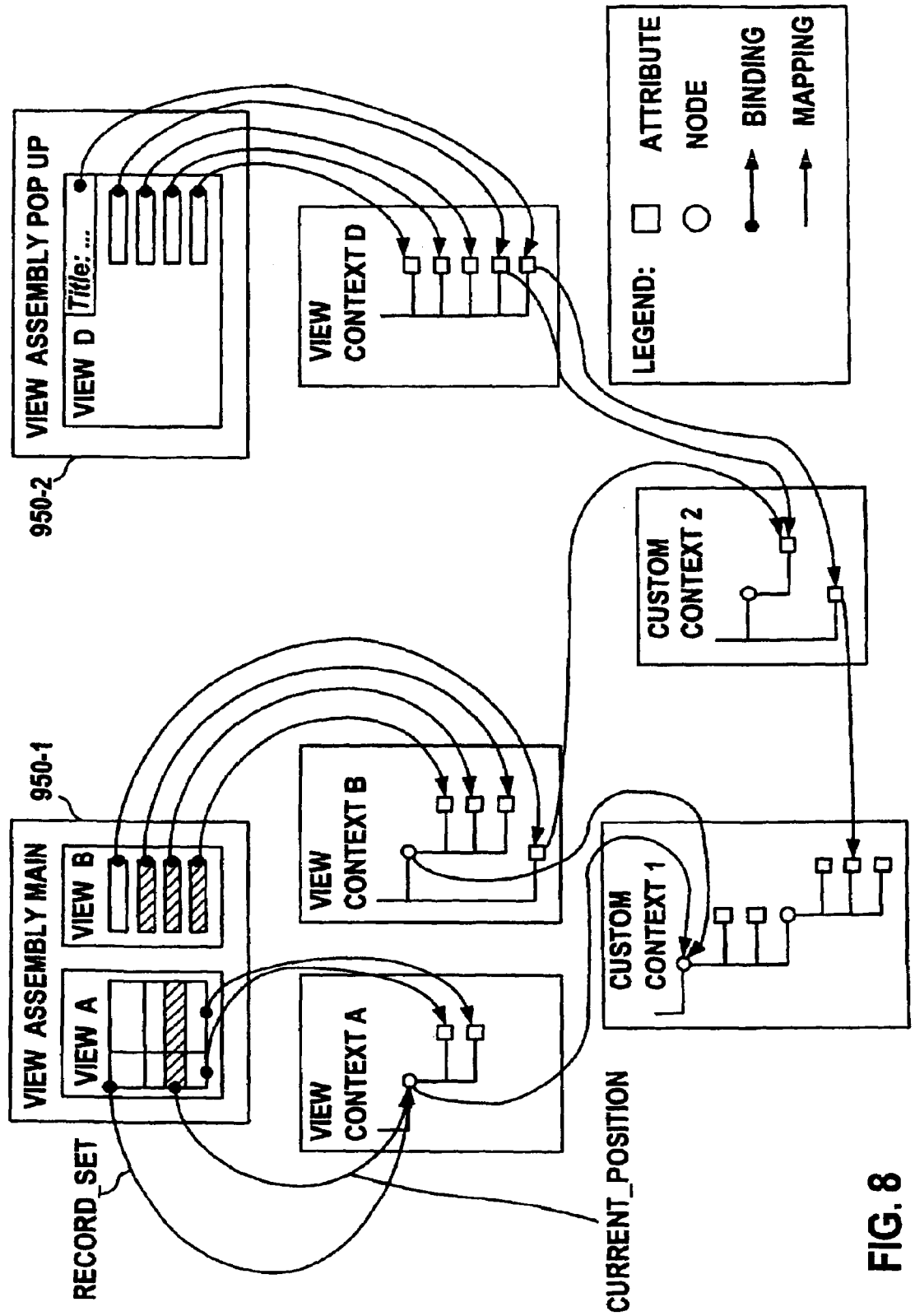

FIG. 8 illustrates another example of mappings between contexts. In this example, two windows 950-1, 950-2 are displayed at runtime on a client of a client-server system. The windows are part of a user interface of an application and can be displayed on a conventional display device (e.g., monitor) of the client. The user interface that is displayed may include one or more view assemblies or view sets.

The first window 950-1 displays view assembly MAIN that includes view A and view B. The second window 950-2 displays view assembly POP UP that includes view D. The following description refers to definitions and declarations at design time. The views in the view assemblies include UI elements that are bound to the view contexts of the corresponding views. The binding is illustrated by arrows with a bullet point at the origin. UI elements of views A, B, D are bound to view contexts A, B, D, respectively. One UI element in view A is a table having two columns. The four UI elements in view B are display/input fields that have a relationship to the table of view A. The UI elements in view D correspond to a title of the pop up and four further input/display fields.

The view contexts A, B, D include node/attribute hierarchies for maintaining the data of the corresponding views. Nodes and attributes can derive their state from nodes and attributes of other contexts (e.g., custom contexts 1, 2) that relate to controllers other than the corresponding view controllers (e.g., custom or application controllers). This enables data to be maintained without redundant copies. Furthermore, such mappings can be used to synchronize data dependencies among multiple views.

In the example in FIG. 8, view context A and view context B include one independent node each, which is illustrated as the top-level node of the corresponding context structure. The independent node of view A holds information about which record set is to be used for the table and about the current position within the record set. Both independent nodes are mapped to the corresponding independent node in custom context 1. This means that view A and view B share a common data source (e.g., the record set) provided by the commonly used node of custom context 1. Therefore, the record set displayed in the table of view A is also used as the underlying data for view B. For example, view A can display two columns of the record set, whereas view B can display three fields of a selected row of the record set. This is represented in FIG. 8 by the UI elements that are shaded with a grid pattern. The three fields in view B can also serve as input fields to update the underlying record set. If the underlying record set is updated through the input fields in view B, the changes are automatically reflected in view A by virtue of the mappings. View B displays a further field not related to the record set.

The declaration of data relationships through contexts can lead to redundancy-free data transport between the server and the client, and allows the application illustrated in FIG. 8 to synchronize the table of view A with the input in view B. It also allows an application developer to use the current selection in a custom controller without needing to know how the selection was made (e.g., whether the selection was made using a table view UI element, a dropdown list UI element, or any other UI element capable of making a selection in a list). This can decrease the dependency between the application logic and the presentation logic of an application.

Continuing with the example in FIG. 8, context mappings can also be used for a menu/list (e.g., view D in the view assembly POP UP), which can display data based on the current selection without passing any parameters between views or executing any transport code. In FIG. 8, the next-to-last attribute of view context D is mapped to an attribute of custom context 2. Because the last attribute of view context B maps to the same attribute of custom context 2 as the next-to-last attribute of view context D, the content of the upper input/display field in view B is the same as the content of the upper input/display field in view D. No code for transporting data from view B to view D is necessary to achieve this effect.

The last attribute of view context D is mapped to the last attribute of custom context 2, which is in turn mapped to the next-to-last attribute of custom context 1. This illustrates that multi-level context hierarchies can be built. Multi-level context hierarchies are useful for packaging data according to its lifetime because, as explained above, contexts can have different lifetimes. Storing data only once in a context hierarchy and using mappings to access the data through multiple levels of the context hierarchy can avoid redundant storage of data and, therefore, reduce memory consumption.

Late Mappings

As described above, nodes and attributes in contexts can map to nodes and attributes in other contexts. The node being mapped will be referred to as a mapped node and the node to which the mapped node refers will be referred to as the origin node. The mapping defines a path between the mapped node and the origin node.

Figure 10:
FIG. 10 illustrates an example of late mapping.
Figure 10:
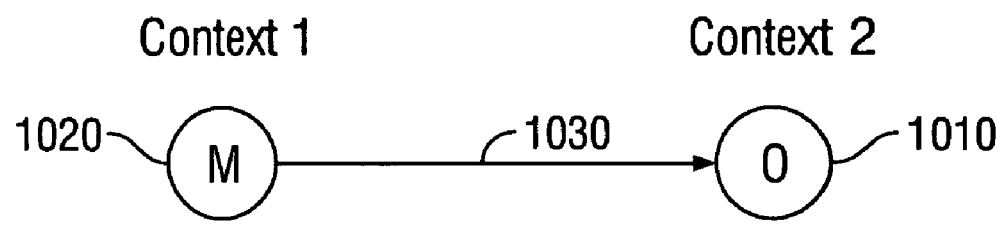

At design time, as shown in FIG. 10, the identity of the origin node 1010 may not be known. In such cases, the mapped node 1020 can still be declared as a mapped node at design time, but the mapping information, which is represented by the path 1030 between the mapped node and the origin node, can remain undefined. This path 1030 (i.e., the mapping information) can be added later, when the identity of the origin node becomes known.

For example, the origin node 1010 may be a node that is added to a context at run time using the techniques described above for dynamically adding nodes to contexts. Once the new node has been added to the context. A late mapping can be specified between other context nodes and the newly added node.

The ability to specify late mappings at run time is useful for pattern-based applications that are configured at run time. Such a pattern-based application can include nested components. For example, a parent component can include one or more child components. The parent component, however, may not know until run time which child component will be nested within the parent component. Similarly, an instance of a child component may not know until run time what instance of a parent component it will be nested in. For example, one instance of the child component may be nested in a parent component for a CRM application while another instance of the child component may be nested in a parent component for a HCM application. In such a scenario, late mappings can be used at run time to specify mappings from contexts in a parent component to contexts in a child component (and vice versa).

In some implementations, the late mapping mechanism can also be used to enforce various constraints, such as making sure that a mapped node is of the same type as an origin node (e.g., that both nodes are either model nodes or value nodes), and that a mapped attribute is of the same type as an origin attribute. Other types of constraints or validity checks can also be implemented.

Generic Model Nodes

As described above, a model node includes a reference to a model object that persists in a corresponding model. At design time, the data type of a model object may not be known. For example, for a pattern-based application, the configuration data can specify a model to be used in the application. Since such configuration data may not be processed until run time, it may not be possible create a context structure based on the model until run time. In such cases, the model node can be declared to be a generic model node. Generic model nodes are model nodes that include special methods for retrieving and setting properties of a referenced model object. At design time, the data type of the referenced model object is not known and therefore is declared to be generic. At run time, the data type of the referenced model object is changed to reflect a specific data type, which can be any one of multiple different data types. The pseudo-code below shows an example of an interface for a generic model node class:

```
public interface IWDGenericModelClass {
    Object getAttribute(String name);
    void setAttribute(String name, Object value)
}
```

In this example, the interface includes a getter method ("getAttribute") that takes as input the name of an attribute for the model object and returns the value of this attribute. The interface also includes a setter method ("setAttribute") that takes as input the name of an attribute and a specified value for this attribute and sets the value of the named attribute to the specified value. The getter and setter methods can use metadata describing a model to traverse the model and read and write data values in the appropriate locations in the model.

The invention can be implemented in digital circuitry or in computer hardware, firmware, or software, or in combinations of them. The invention can be implemented as a computer program product (i.e., a computer program tangibly embodied in an information carrier (e.g., in a machine-readable storage device or in a propagated signal)) for execution by, or to control the operation of, a data processing apparatus (e.g., a programmable processor, a computer, or multiple computers). A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method operations of the invention can be performed by one or more programmable processors executing a computer program to perform functions of the invention by operating on input data and generating output. Method operations can also be performed by, and an apparatus of the invention can be implemented as, special purpose logic circuitry (e.g., an FPGA (field programmable gate array) or an ASIC (application-specific integrated circuit)).

Processors suitable for the execution of a computer program include, by way of example, both general and special purpose microprocessors, and any one or more processors of any kind of digital computer. Generally, a processor will receive instructions and data from a read-only memory, a random access memory, or both. The essential elements of a computer are a processor for executing instructions and one or more memory devices for storing instructions and data. Generally, a computer will also include, or be operatively coupled to receive data from, transfer data to, or both, one or more mass storage devices for storing data (e.g., magnetic, magneto-optical, or optical disks). Information carriers suitable for embodying computer program instructions and data include all forms of non-volatile memory, including by way of example semiconductor memory devices (e.g., EPROM, EEPROM, and flash memory devices), magnetic disks (e.g., internal hard disks or removable disks), magneto-optical disks, and CD-ROM and DVD-ROM disks. The processor and the memory can be supplemented by, or incorporated in special purpose logic circuitry.

To provide for interaction with a user, the invention can be implemented on a computer having a display device (e.g., a CRT (cathode ray tube) or FPD (flat panel display) (e.g., LCD (liquid crystal display)) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual, auditory, or tactile); and input from the user can be received in any form, including visual, auditory, or tactile input.

The invention can be implemented in a computing system that includes a back-end component (e.g., a data server), a middleware component (e.g., an application server), a front-end component (e.g., a client computer having a graphical user interface or a Web browser through which a user can interact with an implementation of the invention), or any combination of such back-end, middleware, and front-end components. The components of the system can be interconnected by any form or medium of digital data communication (e.g., a communication network). Examples of communication networks include a local area network ("LAN") and a wide area network ("WAN") (e.g., the Internet).

The computing system can include clients and servers. A client and server are generally remote from each other and typically interact through a communication network. The relationship of client and server arises by virtue of computer programs running on the respective computers and having a client-server relationship to each other.

The invention has been described in terms of particular implementations. Other implementations are within the scope of the following claims.

The invention claimed is:

1. A computer program product, tangibly embodied in a computer-readable storage medium, the storage medium comprising instructions which when executed on a data processing apparatus cause the data processing apparatus to perform operations comprising:
   accessing a first predetermined structure for a first storage area, the first storage area relating to a controller and provided independently from a model, the controller being operable to manipulate the model and a view, the view including multiple user interface (UI) elements for presenting data from the model, wherein the first predetermined structure includes multiple design-time context elements and relationships between the design time-context elements, wherein the design-time context elements comprise nodes and attributes, wherein the relationships between the design time-context elements organize the nodes and attributes in a hierarchical arrangement, and further wherein at least one of the UI elements is bound to one of the design-time context elements;
   modifying the first predetermined structure, wherein the modifying includes adding new nodes and attributes to the hierarchical arrangement and mapping one of the design-time context elements to a second design-time context element in a second, distinct predetermined structure for a second, distinct storage area; and
   creating an instance of the first storage area according to the predetermined structure, the instance of the first storage area including multiple run-time context elements, the run-time context elements comprising node collections, and each run-time context element corresponding to one of the design-time context elements, wherein the creating comprises generating new node collections corresponding to the new nodes and attributes.

2. The product of claim 1, wherein the operations further comprise resetting the first predetermined structure to an initial state.

3. The product of claim 1, wherein:
   the model comprises multiple model objects of multiple different types; and
   at least one of the design-time context elements in the first predetermined structure references one of the model objects and has an associated method operable to access the attributes of the referenced model object.

4. The product of claim 3, wherein at design time, the type of the referenced model object is declared to be generic, and at run time, the type of the referenced model object is updated to reflect a specific type, the specific type being any one of the multiple different types.

5. A computer program product, tangibly embodied in a computer-readable storage medium, the storage medium comprising instructions which when executed on a data processing apparatus cause the data processing apparatus to perform operations comprising:
   executing an application, the application including:
   at least one view, the view comprising multiple user interface (UI) elements for presenting data from a model, the model comprising multiple model objects;
   at least one controller for manipulating the model and the view;
   a first storage area corresponding to the controller and provided independently from the model, the first storage area including a first predetermined structure, the first predetermined structure including multiple design-time context elements and relationships between the design time-context elements, wherein the design-time context elements comprise nodes and attributes, and wherein the relationships between the design time-context elements organize the nodes and attributes in a hierarchical arrangement; and
   one or more bindings linking the UI elements in the view and the design-time context elements; and
   during execution of the application:
   modifying the first predetermined structure, wherein the modifying includes adding new nodes and attributes to the hierarchical arrangement and mapping one of the design-time context elements to a second design-time context element in a second, distinct predetermined structure for a second, distinct storage area; and creating an instance of the first storage area according to the first predetermined structure, the instance of the first storage area including multiple run-time context elements, the run-time context elements comprising node collections, and each run-time context element corresponding to one of the design-time context elements, wherein the creating comprises generating new node collections corresponding to the new nodes and attributes.

6. The product of claim 5, wherein:
modifying the first predetermined structure includes deleting a node from the hierarchical arrangement.

7. The product of claim 5, wherein:
modifying the first predetermined structure includes deleting an attribute from the first predetermined structure.

8. The product of claim 5, wherein:
a subset of the attributes in the design-time context elements are attributes that represent application data, the application data having a data type, each attribute having a data type corresponding to the data type of the application data being represented; and
modifying the first predetermined structure includes changing the data type of one of the attributes in the metadata tree.

9. The product of claim 5, wherein the operations further comprise:
after modifying the first predetermined structure, resettling the first predetermined structure by removing any modifications made to the first predetermined structure during execution of the application.

10. The product of claim 5, wherein the mapped design-time context elements and the second design-time context elements comprise one or more of nodes and attributes.

11. The product of claim 5, wherein:
each of the model objects has a model object type and includes one or more attributes;
the first predetermined structure includes one or more model nodes, each model node including a reference to one of the model objects; and
the first predetermined structure further includes one or more generic model nodes, each generic model node being a model node that includes methods operable to access the attributes of model objects having distinct model object types.

12. The product of claim 11, wherein the methods include a getter method for retrieving a value of an attribute of a referenced model object and a setter method for setting the value of the attribute of the referenced model object.

13. Apparatus comprising:
processor and computer-readable storage medium;
means for accessing a first predetermined structure for a first storage area, the first storage area relating to a controller and provided independently from a model, the controller being operable to manipulate the model and a view, the view including multiple user interface (UI) elements for presenting data from the model, wherein the first predetermined structure includes multiple design-time context elements and relationships between the design time-context elements, wherein the design-time context elements comprise nodes and attributes, wherein the relationships between the design time-context elements organize the nodes and attributes in a hierarchical arrangement, and further wherein at least one of the UI elements is bound to one of the design-time context elements;
means for modifying the first predetermined structure, wherein the modifying includes adding new nodes and attributes to the hierarchical arrangement and mapping one of the design-time context elements to a second design-time context element in a second, distinct predetermined structure for a second, distinct storage area; and
means for creating an instance of the first storage area according to the predetermined structure, the instance of the first storage area including multiple run-time context elements, the run-time context elements comprising node collections, and each run-time context element corresponding to one of the design-time context elements, wherein the creating comprises generating new node collections corresponding to the new nodes and attributes.

14. A method comprising:
accessing a first predetermined structure for a first storage area, the first storage area relating to a controller and provided independently from a model, the controller being operable to manipulate the model and a view, the view including multiple user interface (UI) elements for presenting data from the model, wherein the first predetermined structure includes multiple design-time context elements and relationships between the design time-context elements, wherein the design-time context elements comprise nodes and attributes, wherein the relationships between the design time-context elements organize the nodes and attributes in a hierarchical arrangement, and further wherein at least one of the UI elements is bound to one of the design-time context elements;
modifying the first predetermined structure, wherein the modifying includes adding new nodes and attributes to the hierarchical arrangement and mapping one of the design-time context elements to a second design-time context element in a second, distinct predetermined structure for a second, distinct storage area; and
creating an instance of the first storage area according to the predetermined structure, the instance of the first storage area including multiple run-time context elements, the run-time context elements comprising node collections, and each run-time context element corresponding to one of the design-time context elements, wherein the creating comprises generating new node collections corresponding to the new nodes and attributes.

* * * * *

UNITED STATES PATENT AND TRADEMARK OFFICE
CERTIFICATE OF CORRECTION

PATENT NO. : 7,581,204 B2
APPLICATION NO. : 10/859593
DATED : August 25, 2009
INVENTOR(S) : Reeder et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1485 days.

Signed and Sealed this

Fourteenth Day of September, 2010

David J. Kappos
*Director of the United States Patent and Trademark Office*